US 6,570,694 B1

(12) United States Patent
Yegnanarayanan

(10) Patent No.: US 6,570,694 B1
(45) Date of Patent: May 27, 2003

(54) SYSTEM AND METHOD FOR LOW-JITTER ASYNCHRONOUS OPTICAL REGENERATION USING WAVELENGTH SAMPLING

(75) Inventor: Sivasubramaniam S. Yegnanarayanan, Los Angeles, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/519,067

(22) Filed: Mar. 3, 2000

(51) Int. Cl.⁷ .............................................. H04B 10/02
(52) U.S. Cl. ...................... 359/176; 359/158; 359/140; 359/139; 359/161
(58) Field of Search ................................ 359/176, 158, 359/174, 177, 179, 124, 140, 139, 128, 181, 183, 188, 161, 133, 127

(56) References Cited

U.S. PATENT DOCUMENTS

| 5,237,290 A | | 8/1993 | Banu et al. ..................... 331/2 |
| 5,416,769 A | | 5/1995 | Karol ........................... 370/60 |
| 5,469,284 A | | 11/1995 | Haas ........................... 359/139 |
| 5,486,943 A | | 1/1996 | Sasayama et al. ............ 359/123 |
| 5,734,486 A | | 3/1998 | Guillemot et al. ........... 359/139 |
| 5,737,106 A | * | 4/1998 | Sansonetti et al. ........... 359/140 |
| 5,757,872 A | | 5/1998 | Banu et al. .................. 375/372 |
| 5,831,752 A | * | 11/1998 | Cotter et al. ................. 359/135 |
| 5,999,293 A | * | 12/1999 | Manning ...................... 359/139 |
| 6,067,180 A | * | 5/2000 | Roberts ........................ 359/181 |
| 6,091,524 A | * | 7/2000 | Ellis et al. ................... 359/123 |
| 6,282,007 B1 | * | 8/2001 | Roberts ........................ 359/181 |
| 6,373,608 B1 | * | 4/2002 | Desurvire et al. ............ 359/158 |

OTHER PUBLICATIONS

*A Flexible Cross–Connect Network Using Multiple Optical Carriers*, by G. Depovere, et al. of Philips Research Laboratories, The Netherlands and N. Wauters, et al. of IMEC–LEA, University of Gent, Belguim (4 pgs.).

* cited by examiner

Primary Examiner—Leslie Pascal
Assistant Examiner—Hanh Phan
(74) Attorney, Agent, or Firm—Gray Cary Ware & Freidenrich, LLP

(57) ABSTRACT

A system and method for regenerating an optical signal in a telecommunications network. The regenerator receives a generated multiple wavelength local clock signal and an input optical signal at an optical gating element. The input optical data causes a sampling of the multiple wavelength local clock signal to output optical domain sampled local clock signals on a fiber. A demultiplexer splits the signal into a set of individual wavelength sampled local clock signals and outputs each onto a separate output fiber. The electrical energy of each is measured using an optical tap and an optical to electrical converter and a controller. Based on the highest energy level of the tapped signals, a control signal is created and sent to an optical switch that selects the highest energy optical domain sampled local clock signal and passes it through as the regenerated signal.

23 Claims, 2 Drawing Sheets

SYSTEM AND METHOD FOR LOW-JITTER ASYNCHRONOUS OPTICAL REGENERATION USING WAVELENGTH SAMPLING

TECHNICAL FIELD OF THE INVENTION

The present invention relates generally to telecommunications systems and methods, and more particularly, a system and method for an improved optical regenerator.

BACKGROUND OF THE INVENTION

Optically transparent packet data transmission technologies that provide access to the entire transport bandwidth (i.e., asynchronous transmission) while reducing or eliminating the costly synchronization provided by the traditional SONET/SDH layer have attracted attention following the tremendous growth of the internet (i.e., global computer network). In order to transport an optical signal over a long distance, the optical signal must be regenerated to avoid degradation of the signal that will occur over long distance transmission. This is accomplished using an optical regenerator.

Conventional signal regenerators are electronic devices comprising electrical components. As a result, current regeneration of the optical signal requires the optical signal to be converted to an electrical signal, regenerated using an electronic signal regenerator, the regenerated electrical signal is converted to an optical signal and the regenerated optical signal is forwarded over the optical network. The conversion from an optical to electrical signal requires a clock recovery circuit that synchronizes the input data clock rate in order to maintain the integrity of the signal payloads. Currently these clock recovery circuits require continuous (or synchronous) data without gaps between the data packets because the local clock and input data will become de-synchronized, resulting in errors (e.g., lost data) in the regeneration process. Therefore, these conventional electrical regenerators are not useful for asynchronous optical data networks.

Therefore, a need exists for an all transparent all-optical asynchronous optical signal regenerator that would maintain the optical signal quality when transporting optical signals across a large backbone asynchronous optical network. In such a transparent optical packet network, the optical packet payload could remain in the optical domain from the source to the destination in the network without suffering the optical/electronic conversions (and the associated conversion circuits), the data integrity problems and the associated bandwidth limitations (i.e., gaps between data packets can be tolerated during regeneration).

Recently, an all-optical asynchronous regenerator was proposed where traditional clock recovery is replaced by an asynchronous optical regenerator that regenerates the incoming packet while converting to the bit-rate of a local clock source. D. Cotter and A. D. Ellis, *Asynchronous Digital Optical Regeneration and Networks, IEEE Journal of Lightwave Technology*, Vol. 16, No: 12, pp 2068–2080, December 1998, hereby incorporated by reference in its entirety. The basic idea of this proposal is to use the incoming data pattern to trigger an all-optical "gate" from a set of multiple optical gates in parallel, and gate out optical pulses from a continuously running local optical oscillator (clock). The local oscillator is nominally operating at the data bit rate; hence a regenerated data is generated from the local clock source. In this proposal, discrimination of the local clock phase on a packet by packet basis needs to be performed. The authors propose to solve this issue by using several phase-shifted versions of the local clock, and gating the clock output with the maximum energy.

However, this proposed system has two distinct disadvantages: first, the proposed regenerator has an inherently high jitter (i.e., noise) that will result in degradation of the optical signal, and second, the number of optical gates in parallel required to reach a level of accuracy associated with current synchronous regeneration systems is very high. Thus, this proposed optical regenerator does not easily scale and the complexity of the optical regenerator increases dramatically when jitter tolerance is increased in order to achieve performance close to that of synchronous optical regeneration systems. While the jitter tolerance of this proposed asynchronous optical regenerator may be able to be improved, it would require the use of a large number of optical gates to sample the multiple local clock phases, thereby introducing signficant complexity into the regenerator architecture and requiring more space and numerous expensive optical gates. Also, the proposed solution requires the incoming signal to be split many times which causes a large optical insertion loss and reduced sensitivity of the optical regenerator. This prevents scaling beyond a certain level because the split signal will eventually approach the noise boundary. This may be able to be overcome by optical pre-amplification to compensate for this large splitter loss, however, this will require costly optical pre-amplification.

SUMMARY OF THE INVENTION

The present invention provides an asynchronous, low-jitter, optical regenerator that reduces complexity, is scalable and improves reliability.

More specifically, the present invention provides a system for regenerating an optical signal in a telecommunications network. The optical regenerator receives a generated multiple wavelength local clock signal and an input optical signal comprising asynchronous optical packets at an optical gating element. The input optical data causes a sampling of the multiple wavelength local clock signal at the optical gate. The optical domain sampled local clock signals are output on a single fiber. A demultiplexer splits the signal into a set of individual wavelength sampled local clock signals and outputs each onto a separate output fiber. The electrical energy of each is measured using an optical to electrical converter and a controller. Based on the highest energy level measured, a control signal is created and sent to an optical switch that selects the highest energy optical domain sampled local clock signal and passes it through as the regenerated signal.

The present invention provides an important technical advantage by providing an asynchronous optical regenerator that does not require optical-to-electronic conversion of an optical signal for the regeneration of the optical signal.

The present invention provides a technical advantage over previously suggested optical regenerators because it significantly reduces the complexity of the asynchronous optical regenerator while simultaneously increasing jitter tolerance to achieve performance compatible with that of a synchronous optical regenerator.

The present invention provides yet another technical advantage by eliminating the large input optical insertion loss due to the large passive optical splitter in previously suggested asynchronous optical regenerators. This eliminates expensive pre-amplifiers while improving the sensitivity of the asynchronous optical regenerator.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein.

DETAILED DESCRIPTION OF THE INVENTION

Preferred embodiments of the present invention are illustrated in the FIGUREs, like numerals being used to refer to like and corresponding parts of the various drawings.

The present invention is an asynchronous optical regenerator that utilizes optical domain dimensions, for example wavelength dimensions, to multiplex different local clock signals onto unique optical domains (e.g., wavelengths) that share a single optical gate. A sampling operation is then performed using a single optical gating element (as opposed to multiple optical gating elements as proposed in Cotter & Ellis), and the different sampled local clock phases are separated using a simple passive wavelength demultiplexer. Thus, multiple optically gated samples are obtained. After the sampling operation is performed in the optical gate, the signals on the different wavelengths are demultiplexed using a simple wavelength demultiplexer. In this manner, reliable low-jitter performance is achieved while simultaneously simplifying the required hardware components to provide scalability.

Figure 1:
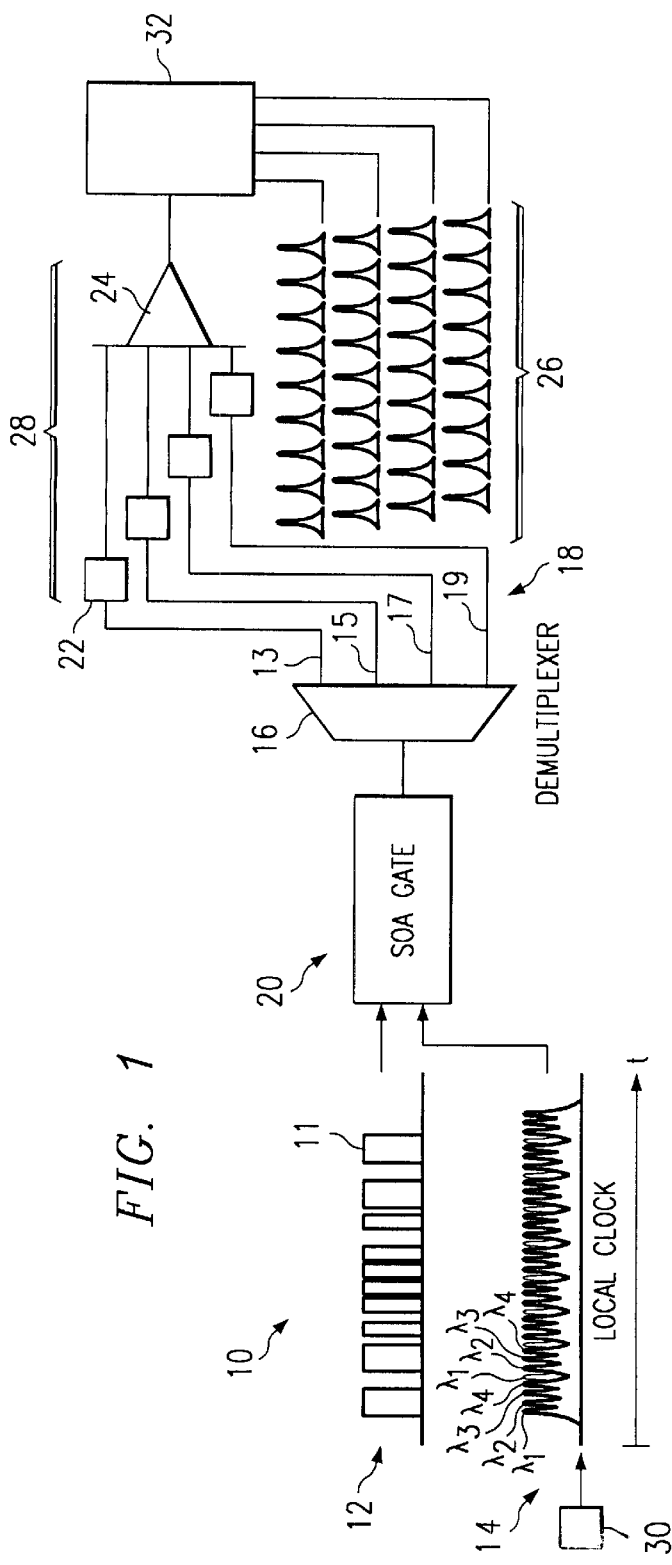
FIG. 1 shows one embodiment of an asynchronous optical regenerator according to the present invention.

FIG. 1 shows one embodiment of the asynchronous optical regenerator 10 of the present invention. FIG. 1 shows an optical gating element 20 receiving input data 12 from an optical telecommunications network and a set of multiple local clock signals 14 (in different optical domains where "optical domain" means individual wavelengths, individual polarization states, or other optical characteristics) from a multiple local clock signal generator 30. The input data 12 can comprise any optical signal that needs regeneration from any area of a telecommunications network (e.g., a transmission device or a node), and can comprise asynchronous optical packets as shown in FIG. 1. The optical gating element 20 of FIG. 1 is shown as a semiconductor optical amplifier (SOA) gate, however it should be understood that the optical gating element 20 could be any optical gating device or optical switching element, such as a non-linear optical loop mirror (NOLM). The only requirement of the optical gating element 20 is that it must be able to handle the input data rate.

FIG. 1 shows a representation of the input optical signal 12 and the multiple local clock signals 14 over time on the horizontal axis. The input data signal 12 is shown as a series of optical data packets 11. As shown in FIG. 1, the multiple optical domain local clock signal generator 30 has generated four different wavelength (or color) local clock signals, $\lambda_1$, $\lambda_2$, $\lambda_3$, and $\lambda_4$, that repeat over a defined phase or time interval. While the embodiment of FIG. 1 shows different wavelength local clocks contained in the multiple local clock signal 14, it should be understood that any other optical characteristic (e.g., polarization state) could be substituted for the wavelength optical domains. Each of the different local clock phase signals can share the same optical gating element 20 because they are distinct optical wavelengths. It should be understood that the multiple local clock signal generator 30 can generate any optical characteristic local clock signals as long as at least two different optical domains are used (for example, two different wavelengths, two different polarization states or a wavelength and a polarization state). FIG. 1 shows four wavelengths of local clock signals within multiple local clock signal 14 for illustration purposes, where each of the local clock signals within each four wavelength set has a different wavelength and phase with respect to each other. For most scenarios, eight distinct optical domains (e.g., four wavelengths (colors) and two polarization states) will provide enough flexibility to meet the performance requirements of the optical regeneration system, though more optical domains can obviously be used. To illustrate the advantages of the present invention, producing the same flexibility in the Cotter & Ellis proposal would require dividing the clock source into four parts with four corresponding control circuits and four optical gates. In contrast, the FIG. 1 embodiment handles four optical domains with a single optical gate 20. In addition to the reduced complexity and cost, the present invention does not require splitting the relatively weak input signal 12 (presuming the input signal 12 needs regeneration) into four parts.

As shown in the FIG. 1 embodiment, the multiple local clock signal generator 30 produces repeating sets of four different wavelength local clock phase signals 14 and provides these to SOA gate 20. SOA gate 20 also receives input optical signal 12 to provide optical gating. In one embodiment, each time the input data 12 is at a high state the SOA gate 20 will be switched ON and will be open for a certain time and each time the input data 12 is at a low or 0 state, the SOA gate 20 will be switched OFF and will be closed for a certain amount of time. In the preferred embodiment, the time period during which the SOA gate 20 is open to sample the multiple optical domain local clock signal 14 is bounded by the minimum time required to sample atleast one of the unique local clock signals in the set of four local clock signals and a maximum time required to sample all four local clocks in a set (thus, sampling of at least one local clock, but no more than all of the local clocks in a single set occurs). For the FIG. 1 embodiment, the sampling at the SOA gate 20 occurs as follows: during the time the SOA gate 20 is ON, a minimum of one and a maximum of four local clocks 14 arrive at the SOA gate 20 so that at least one of the local clock signals 14 will pass through the SOA gate 20 (depending on the gating time of the SOA gate 20); if the SOA gate 20 is OFF, the local clock 14 will not pass through. The SOA gate 20 opens based on the input data 12. In other words, the input data 12 acts as a shutter to open or close the gate in order to sample the local clocks 14. Thus, the output signal from the optical gating element 20 comprises a number of sampled local clocks (e.g., four sampled local clock signals in the example of FIG. 1) each associated with a particular optical domain (in FIG. 1, associated with a particular wavelength). Because each of the multiple local clocks 14 is a different phase and has a different time relationship with respect to the input data 12, one of the local clocks 14 must ultimately be selected to regenerate the correct data.

After the gating operation at SOA gate 20, the signal containing at least one sampled optical domain local clock signal is sent to demultiplexer 16 to separate the signal into its individual optical domain sampled local clock components. Demultiplexer 16 is simply a splitting device that separates the various individual optical domain local clock signals and can be a different device based on the particular optical domain (e.g., a polarizer splitter if the optical domains are different polarizations). The demultiplexer 16 has a set of output fibers 18 equal in number to the number of optical domains in the multiple optical domain local clock 14. Thus, in FIG. 1 because multiple wavelength local clock signal 14 has four wavelengths, $\lambda_1$, $\lambda_2$, $\lambda_3$, and $\lambda_4$, there are four outputs 18 from demultiplexer 16. As shown in FIG. 1, the top output fiber 13 from demultiplexer 16 is assigned to a $\lambda_1$, the second output fiber 15 is assigned to $\lambda_2$, and so on. Thus, if all four wavelengths were sampled at SOA gate 20, then four separate wavelength sampled local clock signals 26 will be demultiplexed from the signal output from the SOA gate 20, and the one associated with $\lambda_1$ will be output on output fiber 13, the one associated with $\lambda_2$ will be output on output fiber 15, and so on for the remaining output fibers so that each output fiber 18 contains a unique wavelength sampled local clock signal 26.

After the demultiplexing or splitting operation, a selection process occurs to select one of the optical domain sampled local clock signals 26 to use as the regenerated signal for the input data 12. Control module 28 is used to measure the energy level of the individual optical domain sampled local clock signals 26, select one of the signals 26 based on maximizing the output power (or other criteria) and sending a control signal to an optical switch to close the path for one of the output fibers 18 and pass the selected optical domain sampled local clock signal 26 through to the optical network.

In one embodiment, the control module 28 comprises a set of optical-to-electrical converters 22 connected to an electrical controller 24. Each output fiber 18 is connected to one of the optical-to-electrical converters 22 through a tap line. A small portion of each of the individual optical domain sampled local clock signals 26 is tapped from each of the output fibers 13, 15, 17 and 19. These tapped optical signals are converted to electrical signals at the optical to electrical converters 22 and forwarded to the controller 24. The controller 24 determines the optimal optical sampled local clock signal 26 by measuring the power of each of these optical domain sampled local clock signals 26. In one embodiment, the integration time for this energy measurement will be the time period equal to the length of the optical burst from input data 12. The measurement is thus performed over a time period equal to the duration and at the end of each optical packet to be regenerated. It should be understood that other energy level choices other than the highest energy can be used, but the highest energy signal 26 will provide the most accurate phase match between the local clock and the input optical packet and is therefore usually preferable.

The controller 24 then creates a control signal designed to select the highest energy optical domain sampled local clock signal 26. The controller 24 sends the control signal to an optical switch 32 in order to select the optical domain sampled local clock signal chosen based on these measured electrical energy levels. The optical switch 32 receives the control signal and passes through the selected optical domain sampled local clock (i.e., the regenerated signal). Basically, the optical switch simply closes a path for the output fiber 18 that carries the optical domain sampled local clock signal that was measured by the controller 24 to have the highest energy level.

Figure 3:
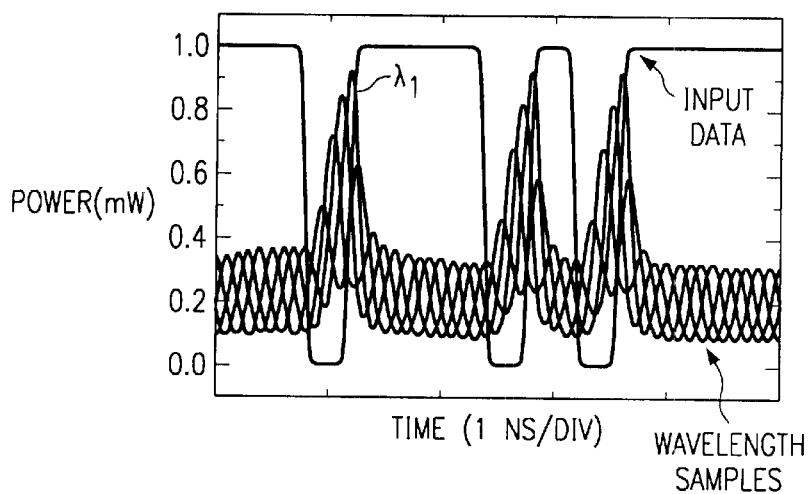
FIG. 3 is a graph of power versus time illustrating an embodiment of optical gate operation for the particular example of NRZ input data and an inverting gate.

FIG. 3 illustrates the simulated time-domain response of an SOA gate 20 (i.e., the optical gating operation) for the specific case of a four wavelength local clock signal 14, non-return to zero (NRZ) input data 12 and an inverting SOA gate 20. It should be understood that the FIG. 3 case is included to show the results of an optical gating operation according to the present invention and is not intended to show the only example or even an optimal example. FIG. 3 is a graph of the input data power (standardized) versus time. As shown, a high (1) in the input non-return to zero (NRZ) data signal 12 drives the SOA gate 20 into saturation, thereby reducing the gain for the local clock wavelengths 14. A low (O) in the input NRZ data signal 12 results in the SOA gate 20 recovering the gain, thereby resulting in an optical gating function for the local clock wavelengths 14. Due to the fast band-to-band carrier recovery lifetime, a rapid gating function is thus established. At the left hand edge of the graph, the input data is high but the SOA gate 20 is closed (because the gate is using an inversion phenomenon) and as the input data 12 goes to a low, the SOA gate 20 opens and sampling of the four wavelength local clocks begins. The different wavelength local clock signals 14 arrive at different instances in time as compared to the arrival of the input data 12 at the SOA gate 12. The highest energy (i.e., power) sampled signal arrives closest to the instant when the SOA gate 12 is fully open. In other words the highest energy sampled wavelenght clock is the one that has the right phase with respect to the opening of the SOA gate 12. Other sampled wavelenghts that are slightly out of phase with the opening of the SOA gate 12 (i.e., arrive earlier or later with respect to the input data 12) will not generate as high a power for the regenerated signal at that phase because they arrive while the SOA gate 12 is either still opening or is shutting down. As shown in FIG. 3, the sample clock having a phase of $_1$ is the sampled clock that results in the highest power. Therefore, the $_1$ sampled local clock signal most closely represents the actual input data 12 and will be selected by the controller 24 to pass and continue through the optical network. The $_1$ sampled local clock signal is regenerated because the sampled signal at $_1$ is now placed on a clean pulse.

Figure 4:
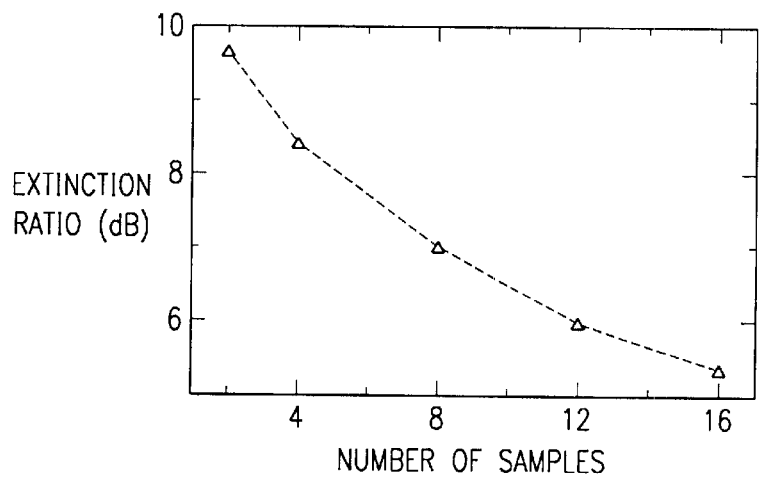
FIG. 4 is a graph of extinction ratio versus time for an embodiment of an optical gate used in conjunction with the present invention.

The scalability, an embodiment of the wavelength-domain sampling optical gate 20 according to the present invention, was evaluated by estimating the extinction ratio available in the optical gate 20 as a function of the number of wavelength-domain samples. FIG. 4 shows the extinction ration on a logrithmic dB scale versus the number of wavelength samples for such an embodiment. With an increase in the number of samples, the SOA gate 20 enters into saturation even when the input data is at a low-level, causing degradation in the extinction ratio. However, as shown in FIG. 4, as many as 12 wavelength clocks may share a single optical gate device 20 while maintaining an extinction ratio greater than 5 dB. Furthermore, the extinction ratio of the signals may be improved using a regenerative device such as a Mach-Zehnder interferometer SOA 20.

Figure 5:
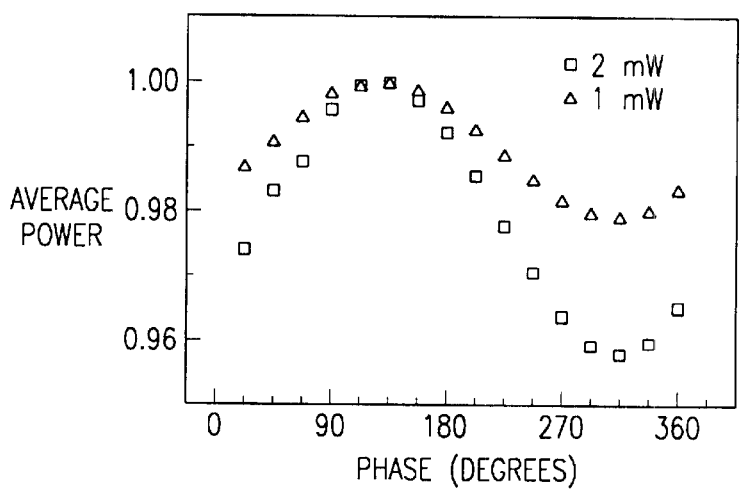
FIG. 5 is a graph of average power versus phase where the average power is measured at the output of the optical gate for various phases of the local clock.

FIG. 5 shows an example of optical gate response as a function of the local clock phase for one wavelength sample. For this particular embodiment, the local clock phase that is optimal is found to be the one that is 180 degree out-of-phase with the clock output having the minimum optical power. Local clock phase determination can be improved with higher input power in the input data 12.

Figure 2:
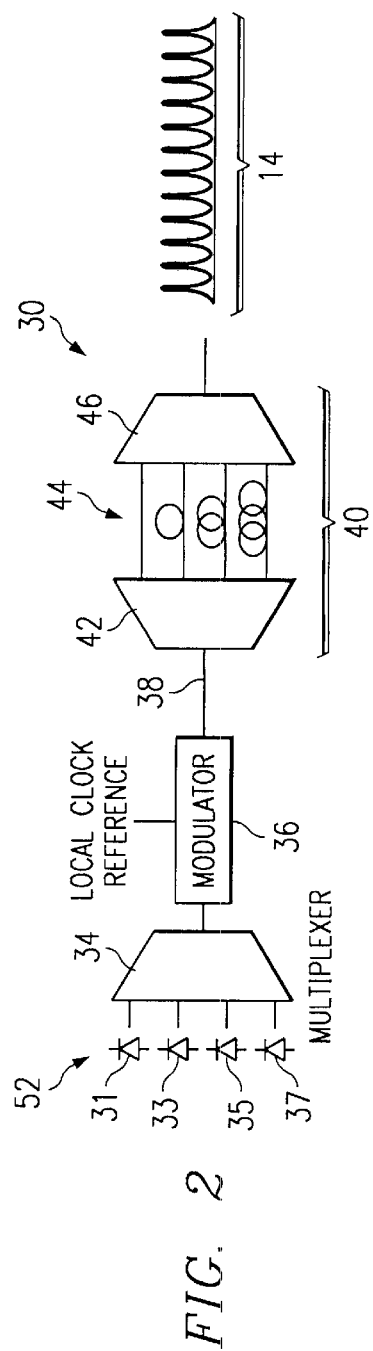
FIG. 2 shows one embodiment of a multiple phase local clock generator according to the present invention.

FIG. 2 shows one embodiment of a multiple local clock signal generator 30 for generating generate multiple local clock signals 14. The multiple local clock generator 30 of FIG. 2 can generate different phase local clocks on each wavelength (i.e., optical domain) without using several modulator sources. As shown in FIG. 2, different wavelength optical signals 52 are provided from a bank of continuous wave sources (as shown in FIG. 2, four wavelengths 31, 33, 35 and 37 are generated from four distinct laser sources). These four wavelength optical signals are multiplexed onto a single fiber using a wavelength multiplexer 34. Following the multiplexer 34, the single optical signal (having four wavelengths) is passed through a modulator/switch device 36 that is used to define or modulate the local reference (electrical or electronic) clock signal onto the optical signal. An example of a modulator 36 that will perform this function is an LiNbO$_3$ external modulator that has a wide optical bandwidth of operation, a high power handling capability and is well suited to the simultaneous modulation of all the wavelengths on the single optical signal. Another example is an electro-absorption modulator which is compact and has lower drive voltage requirements.

Thus, modulator 36 outputs a multiple optical domain, local clock phase signal 38 that is sent to an optical delay device 40 that will delay each of the individual optical domain local clock phase signals different amounts and outputs them as a multiple optical domain local clock signal 14. In the embodiment of FIG. 2, the optical delay device 40 comprises a demultiplexer 42 having a set of fiber delay lines 44 connected to a multiplexer 44. The number of fiber delay lines 44 will equal the number of optical domain signals 52 input into the multiplexer 36. Each fiber delay line will have a different amount of delay. Demultiplexer 42 then splits the multiple optical domain, local clock phase signal 38 into four unique optical domain (i.e., wavelength), identical local clock signals and outputs each onto a separate delay fiber out of the fiber delay lines 44. As a result, the input to the multiplexer 46 is a set of four unique optical domain, unique phase local clock signals. The multiplexer 46 will combine the individual unique optical domain, unique phase local clock signals into a single signal on a single output that is a multiple local clock signal comprising four unique optical domain signals where each has a unique phase local clock.

In summary, the present invention provides a compact low-jitter asynchronous optical regenerator using wavelength-domain optical sampling to share a single optical gate. This approach features low-jitter operation while reducing the component complexity of the optical regenerator. Although the present invention has been described in detail, it should be understood that various changes, substitutions and alterations can be made hereto without departing from the spirit and scope of the invention as described by the appended claims.

What is claimed is:

1. An optical signal regenerator to regenerate an optical signal in a telecommunications network, comprising:
    a multiple local clock signal generator to generate a multiple optical domain local clock signal comprising a plurality of local clock signals wherein each local clock signal has a unique phase with respect to every other local clock signal in the plurality of local clock signals;
    an input optical signal comprising asynchronous optical packets;
    an optical gating element operable to receive the input optical signal, sample the multiple optical domain local clock signal for a sampling time period, and output at least one optical domain sampled local clock signal;
    a splitter device having multiple outputs wherein each output is assigned to a particular optical domain, and wherein the splitter device is operable to place each optical domain sampled local clock signal onto the output that is assigned to a matching optical domain;
    an optical to electrical converter coupled to each output that taps the optical domain sampled local clock signal and converts the tapped optical signal to a tapped electrical signal;
    a controller that measures an electrical energy level for each tapped electrical signal and creates a control signal;
    an optical switch that receives the control signal from the controller, selects one of the optical domain sampled local clock signals based on the control signal, and passes through the selected sampled optical domain local clock signal.

2. The regenerator of claim 1, wherein the multiple local clock signal generator comprises:
    a plurality of continuous wave lasers operable to generate a plurality of optical signals in a plurality of distinct optical domains;
    an optical multiplexer operable to receive the plurality of optical domain signals from a plurality of input fibers and place the plurality of optical domain signals onto a single output fiber to produce a multiple optical domain signal;
    an optical device for receiving the multiple optical domain signal and a local reference clock and operable to modulate the local reference clock onto the multiple optical domain signal to provide a multiple optical domain, local clock phase signal;
    an optical delay device, operable to:
        split the multiple optical domain, local clock signal into a plurality of unique optical domain, identical local clock phase signals;
        output each of the plurality of unique optical domain, identical local clock phase signals through a unique fiber delay device to insert a unique phase shift into each unique optical domain, identical local clock phase signal to produce a plurality of unique optical domain, unique phase local clock signals; and
        combine the plurality of unique optical domain, unique local clock phase signals to produce a multiple local clock signal comprising a plurality of unique optical domain signals each having a unique phase local clock.

3. The regenerator of claim 1, wherein the optical gating element will open for a time period when the input data is at a defined state and sample the multiple optical domain local clock signal.

4. The regenerator of claim 1, wherein the demultiplexer has a set of output fibers equal in number to the number of optical domains in the multiple optical domain local clock.

5. The regenerator of claim 1, wherein the multiple optical domains of the multiple optical domain local clock signal comprise multiple, unique wavelengths, polarization states or a combination of both.

6. The regenerator of claim 1, wherein the multiple optical domains of the multiple optical domain clock signal comprise a defined number of unique optical domains such that the plurality of local clock signals comprise repeating sets of local clock signals where each local clock signal in a set has a unique optical domain with respect to every other local clock signal in the set.

7. The regenerator of claim 1, wherein the sampling time period is a period long enough to sample at least one local clock signal, but no longer than the time to sample each unique optical domain local clock signal.

8. The regenerator of claim 1, wherein the sampling time period is a period long enough so that at least one of the sampled local clock signals occurs while the optical gating element is completely open.

9. The regenerator of claim 1, wherein the optical gating element is an optical SOA gate, and wherein the optical SOA gate samples the multiple optical domain local clock signal based on the input optical signal such that each time the input optical signal is at a high state the SOA gate 20 will be switched on.

10. The regenerator of claim 1, wherein the controller measures the electrical energy level over an energy measurement time period equal to the duration of the optical packet to be regenerated.

11. The regenerator of claim 1, wherein the selected sampled optical domain local clock signal is the regenerated input optical signal.

12. The regenerator of claim 1, wherein the multiple optical domains of the multiple optical domain local clock signal are multiple wavelengths, the optical gating element is an optical SOA gate, the splitter device is a demultiplexer, and the optical switch is an optical SOA gate.

13. The method of claim 1, generating the multiple local clock signal further comprises:
   generating a plurality of optical signals in a plurality of distinct optical domains;
   placing the plurality of optical domain signals onto a single output fiber to produce a multiple optical domain signal;
   modulating a local reference clock onto the multiple optical domain signal to produce a multiple optical domain, local clock phase signal;
   splitting the multiple optical domain, local clock phase signal into a plurality of unique optical domain, identical local clock phase signals;
   inserting a unique phase delay into each unique optical domain, identical local clock phase signal to produce a plurality of unique optical domain, unique phase local clock signals; and
   combining the unique optical domain, unique local clock phase signals into a multiple local clock signal.

14. A multiple local clock signal generator, comprising:
   a plurality of continuous wave lasers operable to generate a plurality of optical signals in a plurality of distinct optical domains;
   an optical multiplexer operable to receive the plurality of optical domain signals from a plurality of input fibers and place the plurality of optical domain signals onto a single output fiber to produce a multiple optical domain signal;
   an optical device for receiving the multiple optical domain signal and a local reference clock and operable to modulate the local reference clock onto the multiple optical domain signal to provide a multiple optical domain, local clock phase signal;
   an optical delay device, operable to:
      split the multiple optical domain, local clock signal into a plurality of unique optical domain, identical local clock phase signals;
      output each of the plurality of unique optical domain, identical local clock phase signals through a unique fiber delay device to insert a unique phase shift into each unique optical domain, identical local clock phase signal to produce a plurality of unique optical domain, unique phase local clock signals; and
      combine the unique optical domain, unique local clock phase signals to produce a multiple local clock signal comprising a plurality of unique optical domain signals each having a unique phase local clock.

15. A multiple phase local clock signal generator, comprising:
   a plurality of continuous wave lasers operable to generate a plurality of optical signals over a plurality of fibers in a plurality of wavelengths;
   an optical multiplexer operable to receive and multiplex the plurality of wavelengths onto a single output fiber to produce a multiple wavelength signal;
   an modulator device operable to receive the multiple wavelength signal and a local reference clock and modulate the local reference clock onto the multiple wavelength signal to provide a multiple wavelength, local clock phase signal;
   an optical delay device, comprising:
      a demultiplexer to receive and demultiplex the multiple wavelength, local clock phase signal into a plurality of unique wavelength, identical local clock phase signals, and output each unique wavelength, identical local clock phase signal on a distinct fiber;
      a plurality of passive fiber delay devices of distinct delay intervals, each passive fiber delay device receiving and passing through one of the plurality of unique wavelength, identical local clock phase signals to produce a plurality of unique wavelength, distinct local clock phase signals; and
      a multiplexer to receive and multiplex the plurality of unique wavelength, distinct local clock phase signals into a multiple local clock phase signal comprising a plurality of separate wavelength signals each having a unique local clock phase.

16. A method of regenerating an optical signal, comprising:
   generating a multiple optical domain local clock signal comprising a plurality of local clock signals wherein each local clock signal has a unique local clock phase with respect to every other local clock signal in the plurality of local clock signals;
   receiving an input optical signal at an optical gating element;
   sampling the multiple optical domain local clock signal for a sampling time period at the optical gating element;
   outputting from the optical gating element at least one optical domain sampled local clock signal;
   assigning a plurality of output fibers from the optical gating element to each one of the plurality of optical domains;
   placing each of the at least one optical domain sampled local clock signals onto an output fiber assigned to the optical domain that matches the optical domain of that optical domain sampled local clock signal;
   tapping a portion of each optical domain sampled clock signal from the plurality of output fibers;
   converting each tapped optical signal to a tapped electrical signal;
   measuring an electrical energy level for each tapped electrical signal;
   creating a control signal based on the measured energy levels;
   sending the control signal to an optical switch;

selecting one of the optical domain sampled local clock signals based on the control signal; and passing the selected sampled optical domain local clock signal.

17. The method of claim 16, generating the multiple local clock signal further comprises:

generating a plurality of optical signals in a plurality of distinct optical domains;

placing the plurality of optical domain signals onto a single output fiber to produce a multiple optical domain signal;

modulating a local reference clock onto the multiple optical domain signal to produce a multiple optical domain, local clock phase signal;

splitting the multiple optical domain, local clock phase signal into a plurality of unique optical domain, identical local clock phase signals;

inserting a unique phase delay into each unique optical domain, identical local clock phase signal to produce a plurality of unique optical domain, unique phase local clock signals; and combining the unique optical domain, unique local clock phase signals into a multiple local clock signal.

18. The method of claim 16, wherein sampling the multiple optical domain local clock signal further comprises opening the optical gating element for a time period when the input data is at a defined state.

19. The method of claim 16, wherein the multiple optical domains of the multiple optical domain clock signal comprise a defined number of unique optical domains such that the plurality of local clock signals comprise repeating sets of local clock signals where each local clock signal in a set has a unique optical domain with respect to every other local clock signal in the set.

20. The method of claim 17, wherein the sampling time period is a period long enough to sample at least one local clock signal, but no longer than the time to sample each unique optical domain local clock signal, and is long enough so that at least one of the sampled local clock signals occurs while the optical gating element is completely open.

21. The method of claim 17, sampling of the multiple optical domain local clock signal further comprises sampling the multiple optical domain local clock each time the input optical signal is at a high state.

22. The method of claim 16, wherein measuring an electrical energy level for each tapped electrical signal further comprises measuring the electrical energy level over a time period equal to the duration of the input optical signal to be regenerated.

23. A method of generating a multiple local clock signal, comprising:

generating a plurality of optical signals in a plurality of distinct optical domains;

placing the plurality of optical domain signals onto a single output fiber to produce a multiple optical domain signal;

modulating a local reference clock onto the multiple optical domain signal to produce a multiple optical domain, local clock phase signal;

splitting the multiple optical domain, local clock phase signal into a plurality of unique optical domain, identical local clock phase signals;

inserting a unique phase delay into each unique optical domain, identical local clock phase signal to produce a plurality of unique optical domain, unique phase local clock signals; and combining the unique optical domain, unique local clock phase signals into a multiple local clock signal.

* * * * *